(12) United States Patent
Shao et al.

(10) Patent No.: US 11,971,280 B2
(45) Date of Patent: Apr. 30, 2024

(54) METERING AND CORRECTING METHODS AND SYSTEMS FOR ULTRASONIC GAS METERS BASED ON SMART GAS INTERNET OF THINGS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/465,116

(22) Filed: Sep. 11, 2023

(65) Prior Publication Data

US 2023/0417588 A1    Dec. 28, 2023

(30) Foreign Application Priority Data

Jul. 27, 2023    (CN) .......................... 202310930658.1

(51) Int. Cl.
*G01F 1/667* (2022.01)
*G01F 1/66* (2022.01)
*G01F 15/04* (2006.01)

(52) U.S. Cl.
CPC .............. *G01F 1/667* (2013.01); *G01F 1/666* (2013.01); *G01F 15/043* (2013.01)

(58) Field of Classification Search
CPC ......... G01F 1/667; G01F 1/666; G01F 15/043
(Continued)

(56) References Cited

U.S. PATENT DOCUMENTS

| | | | |
|---|---|---|---|
| 2016/0131516 | A1 | 5/2016 | Frohlich et al. |
| 2021/0010894 | A1 | 1/2021 | Fuji et al. |

FOREIGN PATENT DOCUMENTS

| | | |
|---|---|---|
| BR | PI0801248 A2 | 1/2010 |
| CN | 110926571 A | 3/2020 |

(Continued)

OTHER PUBLICATIONS

Translation of KR-20050092435-A (Year: 2005).*
(Continued)

*Primary Examiner* — Nathaniel T Woodward
(74) *Attorney, Agent, or Firm* — METIS IP LLC

(57) ABSTRACT

The present disclosure provides a metering and correcting method and system for an ultrasonic gas meter based on smart gas Internet of Things (IoT). The metering and correcting method is implemented on a smart gas device management platform of the metering and correcting system and includes: in response to receiving a co-correction request from the ultrasonic gas meter, obtaining ultrasonic data and gas medium data; determining a target signal stability value of the ultrasonic gas meter based on the ultrasonic data and the gas medium data; in response to the target signal stability value not meeting a second preset condition, determining a co-correction strategy and sending the co-correction strategy to the ultrasonic gas meter; and evaluating a correction accuracy of the ultrasonic gas meter for performing a correction process based on the co-correction strategy.

9 Claims, 4 Drawing Sheets

(58) Field of Classification Search
USPC .................................................... 73/861.18
See application file for complete search history.

(56) References Cited

FOREIGN PATENT DOCUMENTS

| | | | |
|---|---|---|---|
| CN | 112964337 | | 6/2021 |
| CN | 112964337 A | * | 6/2021 |
| CN | 113029263 A | | 6/2021 |
| CN | 114459573 A | | 5/2022 |
| CN | 115773797 A | | 3/2023 |
| CN | 116105836 A | * | 5/2023 |
| CN | 116105836 A | | 5/2023 |
| CN | 116242443 A | | 6/2023 |
| CN | 116308125 A | | 6/2023 |
| CN | 116346864 | | 6/2023 |
| EP | 2581715 A1 | | 4/2013 |
| JP | 2013205250 A | | 10/2013 |
| KR | 20050092435 A | * | 9/2005 |
| KR | 20050092435 A | | 9/2005 |

OTHER PUBLICATIONS

Translation of CN-116105836-A (Year: 2023).*
Summary translation of CN-112964337-A (Year: 2021).*
Wang, Xiuqiao et al., Technical Research of Intelligent Ultrasonic Gas Meter, Gas & Heat, 37(8): B26-828, 2017.
Jin, Chao, The Key Technology of Ultrasonic Gas Meter Small Flow Measurement, Ningbo University, 2022, 66 pages.
First Office Action in Chinese Application No. 202310930658.1 dated Aug. 30, 2023, 11 pages.

* cited by examiner

METERING AND CORRECTING METHODS AND SYSTEMS FOR ULTRASONIC GAS METERS BASED ON SMART GAS INTERNET OF THINGS

CROSS-REFERENCE TO RELATED APPLICATIONS

This application claims priority to Chinese Patent Application No. 202310930658.1, filed on Jul. 27, 2023, the entire contents of which are hereby incorporated by reference.

TECHNICAL FIELD

The present disclosure relates to the technical field of Internet of Things gas meters, and in particular, to metering and correcting methods and systems for ultrasonic gas meters based on smart gas Internet of Things.

BACKGROUND

During flow metering with an ultrasonic gas meter, received ultrasonic signals are usually affected by factors such as a propagation medium, an environmental condition, and a reflection in a pipeline, which leads to changes in waveform and/or amplitude, making it difficult to accurately meter a true flow rate. Currently, flow monitoring data is usually corrected for gas velocity fluctuation, temperature stratification, and other noise interference. However, sometimes changes in gas media also cause non-negligible effects on a flow metering accuracy.

Therefore, it is hoped to provide a metering and correcting method and system for an ultrasonic gas meter based on smart gas Internet of Things, which implements gas medium compensation for the flow monitoring data of a gas meter to improve the flow metering accuracy.

SUMMARY

In view of this, the embodiments of the present disclosure provide a metering and correcting method and system for an ultrasonic gas meter based on smart gas Internet of Things to correct flow monitoring data of the ultrasonic gas meter accurately and timely.

One or more embodiments of the present disclosure provide a metering and correcting method for an ultrasonic gas meter based on smart gas Internet of Things. The metering and correcting method is implemented on a smart gas device management platform of a metering and correcting system for an ultrasonic gas meter based on smart gas IoT. The metering and correcting method includes: in response to receiving a co-correction request from the ultrasonic gas meter, obtaining ultrasonic data and gas medium data, wherein the co-correction request is issued when a self-correction signal stability of the ultrasonic gas meter does not meet a first preset condition, and the self-correction signal stability is determined by the ultrasonic gas meter based on a self-correction strategy; determining a target signal stability value of the ultrasonic gas meter based on the ultrasonic data and the gas medium data; in response to the target signal stability value not meeting a second preset condition, determining a co-correction strategy and sending the co-correction strategy to the ultrasonic gas meter; and evaluating a correction accuracy of the ultrasonic gas meter for performing a correction process based on the co-correction strategy.

One or more embodiments of the present disclosure provide a metering and correcting system for an ultrasonic gas meter based on smart gas Internet of Things (IoT). The metering and correcting system includes a smart gas user platform, a smart gas user platform, a smart gas service platform, a smart gas device management platform, a smart gas sensing network platform, and a smart gas object platform. The smart gas user platform is configured to send a query instruction of gas device management information to the smart gas device management platform through the smart gas service platform; and the smart gas device management platform is configured to send instructions for obtaining gas device related data through the smart gas sensing network platform to the smart gas object platform in response to the query instruction of the gas device management information and receive the gas device related data uploaded by the smart gas object platform; process the gas device related data to obtain the gas device management information; and upload the gas device management information to the smart gas user platform through the smart gas service platform, or send the gas device management information to the smart gas object platform through the smart gas sensing network platform; wherein the gas device related data at least includes ultrasonic data and gas medium data, the gas device management information at least includes a co-correction strategy for correcting the ultrasonic gas meter, and a process for determining the co-correction strategy includes: in response to receiving a co-correction request from the ultrasonic gas meter, obtaining the ultrasonic data and the gas medium data, wherein the co-correction request is issued when a self-correction signal stability of the ultrasonic gas meter does not meet a first preset condition, and the self-correction signal stability is determined by the ultrasonic gas meter based on a self-correction strategy; determining a target signal stability value of the ultrasonic gas meter based on the ultrasonic data and the gas medium data; and in response to the target signal stability value not meeting a second preset condition, determining the co-correction strategy.

One or more embodiments of the present disclosure provide a non-transitory computer-readable storage medium, and the storage medium stores computer instructions. When reading the computer instructions in the storage medium, a computer executes the metering and correcting method for the ultrasonic gas meter based on the smart gas Internet of Things.

BRIEF DESCRIPTION OF THE DRAWINGS

The present disclosure is further illustrated by way of exemplary embodiments, which are described in detail by way of the accompanying drawings. These embodiments are non-limiting exemplary embodiments, in which like reference numerals represent similar structures throughout the several views of the drawings, and wherein.

DETAILED DESCRIPTION

Figure 1:
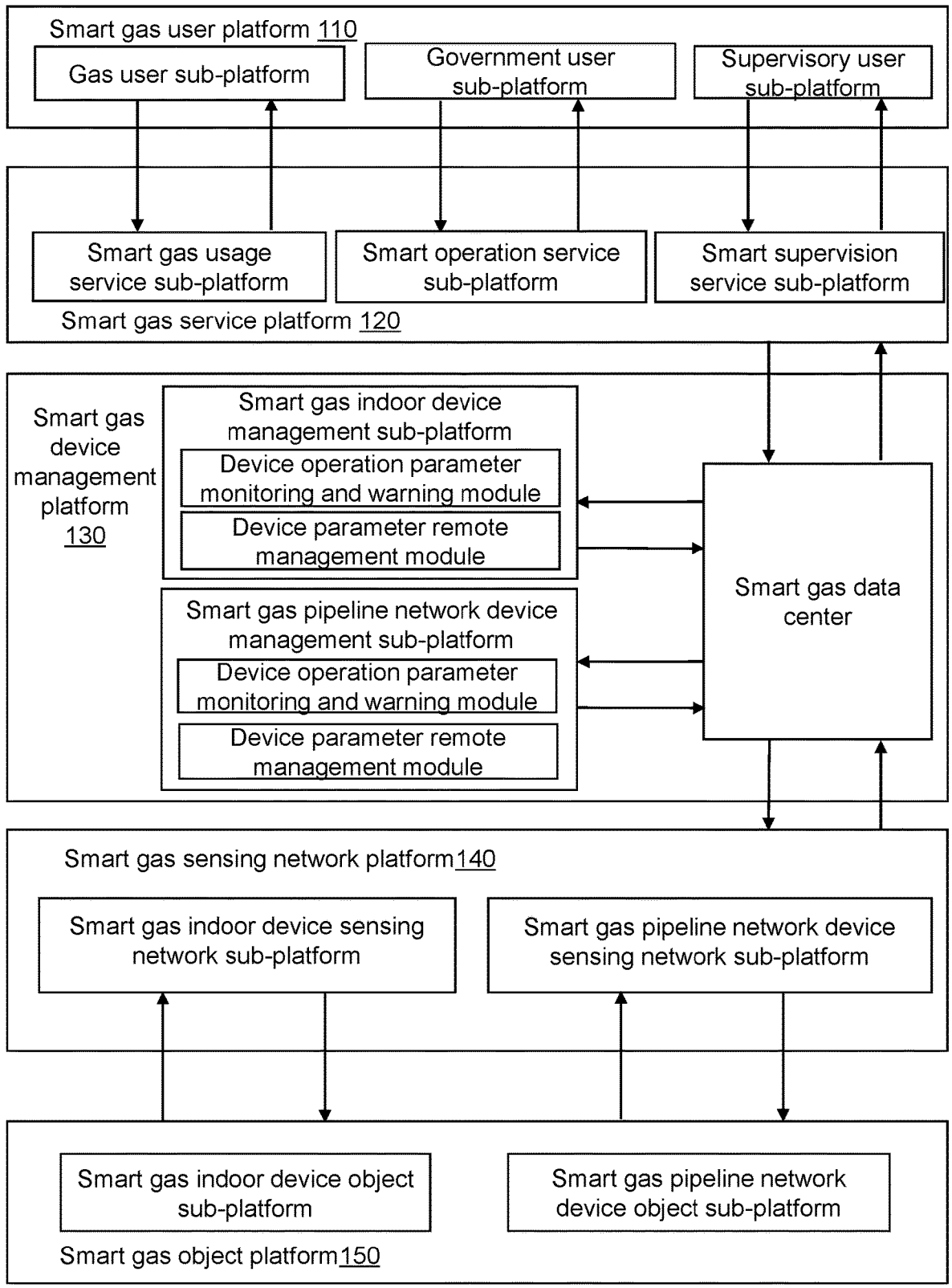
FIG. 1 is a schematic diagram illustrating an exemplary structure of a metering and correcting system for an ultrasonic gas meter based on smart gas Internet of Things according to some embodiments of the present disclosure.

In order to more clearly explain the technical scheme of the embodiment of the present disclosure, a brief description of the accompanying drawings required for the embodiment description is given below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the terms "system", "device", "unit" and/or "module" as used herein are used as a manner for distinguishing different components, elements, parts, sections, or assemblies at different levels. However, if other words serve the same purpose, the words may be replaced by other expressions.

As used in the present disclosure and the appended claims, the singular forms "a," "an," and "the" include plural referents unless the content clearly dictates otherwise; the plural forms may be intended to include singular forms as well. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

Flowcharts are used throughout the present disclosure to illustrate the operations performed by the system according to the embodiments of the present disclosure. It should be understood that the preceding or following operations are not necessarily performed in exact order. Instead, the individual steps may be processed in reverse order or simultaneously. It is also possible to add other operations to these procedures or to remove a step or steps from them.

FIG. 1 is a schematic diagram illustrating an exemplary structure of a metering and correcting system for an ultrasonic gas meter based on smart gas Internet of Things according to some embodiments of the present disclosure. As shown in FIG. 1, the metering and correcting system for the ultrasonic gas meter based on the smart gas Internet of Things 100 (which is referred to as the metering and correcting system 100 hereinafter) may include a smart gas user platform 110, a smart gas service platform 120, a smart gas device management platform 130, a smart gas sensing network platform 140, and a smart gas object platform 150.

The smart gas user platform 110 is a platform for interacting with a user. In some embodiments, the smart gas user platform 110 may be configured as a terminal device.

In some embodiments, the smart gas user platform 110 may include a gas user sub-platform, a government user sub-platform, and a supervision user sub-platform. The gas user sub-platform is a platform that provides gas users with data related to using gas and solutions to problems in using gas. The government user sub-platform is a platform for government users (such as managers of gas operating entities) to provide data related to gas operations. The supervisory user sub-platform is a platform for supervision users (such as personnel of security management departments, etc.) to supervise the operation of the whole Internet of Things system.

The smart gas service platform 120 is a platform for receiving and transmitting data and/or information. The smart gas service platform 120 may obtain gas device management information from the smart gas device management platform 130 and upload the gas device management information to the smart gas user platform 110.

In some embodiments, the smart gas service platform 120 may include a smart gas usage service sub-platform, a smart operation service sub-platform, and a smart supervision service sub-platform. The smart gas service sub-platform is a platform for providing gas services to gas users. The smart operation service sub-platform is a platform for providing gas operation-related information (e.g., the gas device management information, etc.) to government users. The smart supervision services sub-platform is a platform for providing supervision requirements to supervision users.

The smart gas device management platform 130 is a platform that coordinates connection and collaboration between various functional platforms.

In some embodiments, the smart gas device management platform 130 may include a smart gas indoor device management sub-platform, a smart gas pipeline network device management sub-platform, and a smart gas data center.

The smart gas indoor device management sub-platform is configured to process information related to an indoor device. The smart gas pipeline network device management sub-platform is a platform configured to monitor and manage a gas pipeline network device. In some embodiments, the smart gas indoor device management sub-platform and the smart gas pipeline network device management sub-platform include, but are not limited to, a device operation parameter monitoring and warning module and a device parameter remote management module.

The smart gas indoor device management sub-platform and the smart gas pipeline network device management sub-platform may analyze and process relevant information of the indoor device or the gas pipeline network device through each of the modules, and remotely set, adjust, and authorize operation parameters of the indoor device or the gas pipeline network device.

The smart gas data center may be configured to store and manage all operation information of the metering and correcting system 100. In some embodiments, the smart gas data center may be configured as a storage device for storing gas device related data such as ultrasonic data, gas medium data, etc.

In some embodiments, the smart gas device management platform 130 may interact with the smart gas service platform 120 and the smart gas sensing network platform 140 respectively through the smart gas data center.

The smart gas sensing network platform 140 is a functional platform for managing sensing communication. In some embodiments, the smart gas sensing network platform 140 may be configured as a communication network and a gateway.

In some embodiments, the smart gas sensing network platform 140 may include a smart gas indoor device sensing network sub-platform and a smart gas pipeline network device sensing network sub-platform.

In some embodiments, the smart gas sensing network platform 140 may interact with the smart gas device management platform 130 and the smart gas object platform 150 for data interaction to implement functions of perceived information sensing communication and control information sensing communication. For example, the smart gas sensing network platform 140 may receive instructions for obtaining data related to the gas device from the smart gas data center and upload the gas device related data to the smart gas data center.

The smart gas object platform 150 is the functional platform configured to obtain perceived information. In some embodiments, the smart gas object platform may include a smart gas indoor device object sub-platform and a smart gas pipeline network device object sub-platform. In some embodiments, the smart gas object platform may be configured as various types of devices, and the various types of devices include a gas device (e.g., an indoor device and a pipeline network device) and other devices.

In some embodiments, the smart gas indoor device object sub-platform and the smart gas pipeline network device object sub-platform may upload indoor device related data and pipeline network device related data respectively to the smart gas data center through the smart gas indoor device sensing network sub-platform.

Some embodiments of the present disclosure, based on the metering and correcting system 100, an information operation closed-loop between the smart gas object platform 150 and the smart gas user platform 110 is formed, which operates in a coordinated and regular manner under unified management of the smart gas device management platform 130 to realize the informatization and intelligence of gas device management.

It should be noted that the above description of the system and its components is for descriptive convenience only and does not limit the present disclosure to the scope of the embodiments cited.

Figure 2:
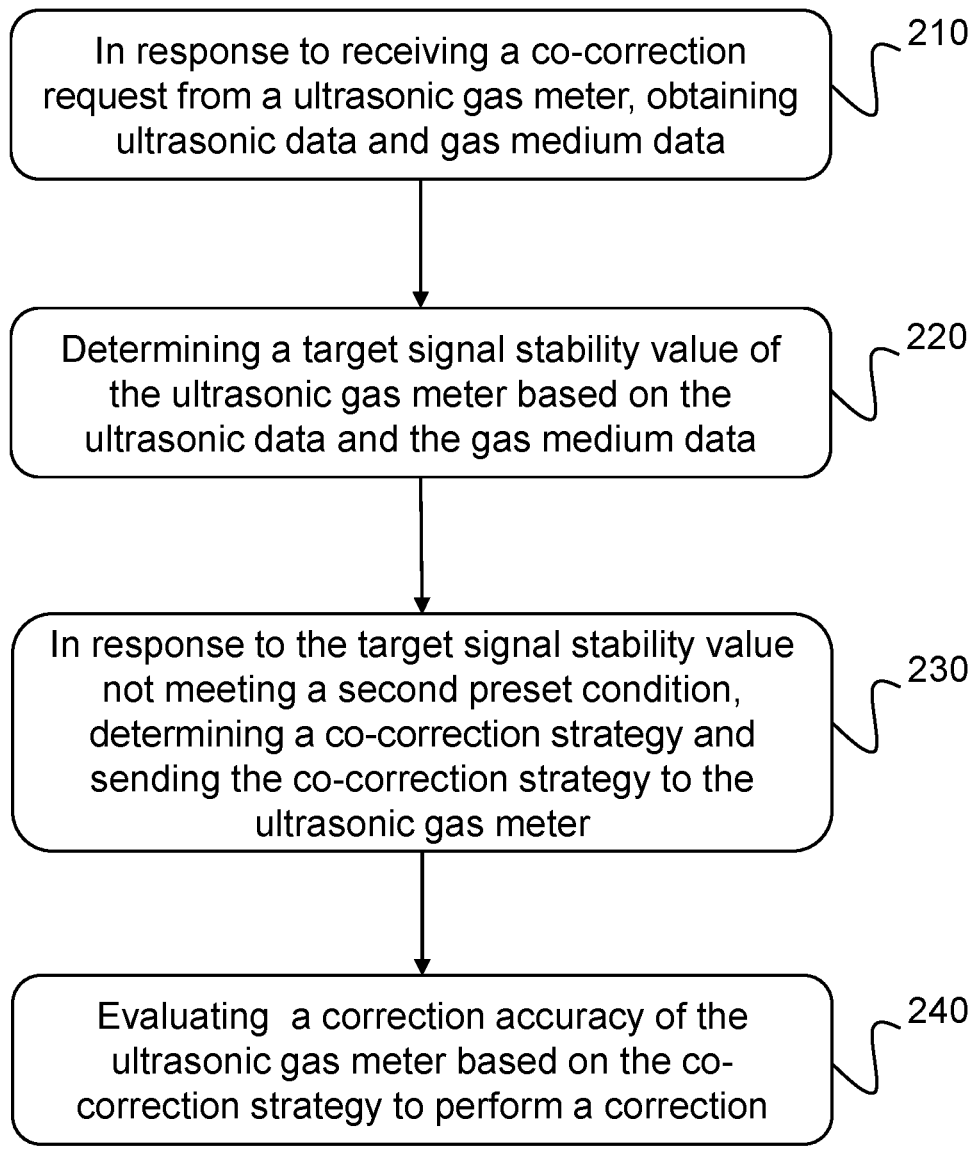
FIG. 2 is an exemplary flowchart illustrating a metering and correcting method for an ultrasonic gas meter based on smart gas Internet of Things according to some embodiments of the present disclosure.

FIG. 2 is an exemplary flowchart illustrating a metering and correcting method for an ultrasonic gas meter based on smart gas Internet of Things according to some embodiments of the present disclosure. As shown in FIG. 2, process 200 includes the following steps. In some embodiments, the process 200 may be performed by the smart gas device management platform 130.

In step 210, in response to receiving a co-correction request from the ultrasonic gas meter, obtaining ultrasonic data and gas medium data.

The co-correction request is a request to the smart gas device management platform for performing a correction on the ultrasonic gas meter. The correction includes determining a signal stability, etc. The co-correction request may be issued by the ultrasonic gas meter.

In some embodiments, the co-correction request may be issued when a self-correction signal stability of the ultrasonic gas meter does not meet a first preset condition.

The signal stability refers to a stability of a signal monitored by the ultrasonic gas meter, and the signal may be an ultrasonic signal and/or gas flow data, etc. For example, the signal stability may include a variation of an ultrasonic waveform, an amplitude, and a frequency and/or a variation of reading data of the ultrasonic gas meter, etc. The signal stability may reflect an accuracy of the reading data of the ultrasonic gas meter. When the signal stability is not steady (i.e., the smaller the signal stability), the accuracy of the reading data of the ultrasonic gas meter is lower.

The self-correction signal stability refers to a signal stability obtained by the ultrasonic gas meter through a self-correction. The self-correction refers to a self-correction on the signal stability of the ultrasonic gas meter.

In some embodiments, the self-correction signal stability may be determined by the ultrasonic gas meter. In some embodiments, the self-correction signal stability is determined based on a self-correction strategy.

In some embodiments, the self-correction signal stability of the ultrasonic gas meter may be obtained by analyzing and processing the reading data of the ultrasonic gas meter at a plurality of moments through the self-correction strategy.

In some embodiments, the self-correction strategy includes at least a self-correction algorithm, and the self-correction signal stability is determined by the self-correction strategy, including obtaining a reading data set of the reading data by the ultrasonic gas meter and determining the self-correction signal stability based on the reading data set and the self-correction algorithm. In some embodiments, the self-correction algorithm may include a plurality of forms, and a corresponding self-correction algorithm needs to be determined before applying the self-correction strategy. Detailed descriptions regarding determining the self-correction signal stability and selecting the self-correction algorithm may be found in FIG. 3 and related descriptions thereof.

In some embodiments, the first preset condition may be that the self-correction signal stability is not less than a first stability threshold. The first stability threshold may be determined by priori knowledge or historical experience.

In some embodiments, the first preset condition may be determined based on the self-correction algorithm. In some embodiments, the first preset condition may be determined by the smart gas device management platform.

In some embodiments, the self-correction algorithm may include a variety of forms when processing the reading data set to determine the self-correction signal stability based on the self-correction algorithm. Accordingly, the first preset condition may include a variety of forms.

In some embodiments, the first preset condition includes at least three forms: (1) a variance result of the reading data set is less than a first threshold; (2) a mean result of the reading data set is less than a second threshold; (3) a statistical check result of the reading data set is less than a third threshold. The variance result, the mean result, and the statistical check result may be determined based on the self-correction algorithm. Further descriptions regarding three processing results, the self-correction algorithm, and the reading data set may be found in FIG. 3 and related descriptions thereof.

The first threshold, the second threshold, and the third threshold may be determined based on historical data or empirical values.

In some embodiments, the smart gas device management platform may determine a plurality of candidate preset conditions based on a self-correction algorithm and determine the first preset condition from the plurality of candidate preset conditions. Further descriptions regarding the self-correction algorithm may be found in FIG. 3 and related descriptions thereof.

In some embodiments, the smart gas device management platform may perform a correction experiment using different candidate preset conditions based on a determined self-correction algorithm, and preferably select a candidate preset condition with a good correction effect as the first preset condition.

The candidate preset condition refers to a preset condition that may be designated as the first preset condition. Different self-correction algorithms correspond to different types of candidate preset conditions. The difference between different candidate preset conditions determined based on a same self-correction algorithm lies in the difference in threshold settings. For example, the candidate preset condition is when the variance result of the reading data set is less than the first threshold. The difference between the different candidate preset conditions is that the first threshold value is different.

In some embodiments, the correction experiment may be that the gas flow data (e.g., the reading data) monitored by the ultrasonic gas meter is corrected based on a specific correction-related condition using different candidate preset conditions and the self-correction algorithm to obtain a corrected gas flow value (e.g., corrected reading data). The correction-related condition may include but is not limited to weather data, a self-correction frequency, a correction level, etc. Further descriptions regarding the self-correction frequency and the correction level may be found in FIG. 3 and related descriptions thereof. Descriptions regarding the weather data may be found in FIG. 2 and related descriptions thereof.

In some embodiments, a correction may be considered effective when a flow difference value between the reading data of the ultrasonic gas meter and an actual gas flow is less than a preset difference threshold. The preset variance threshold may be artificially set by historical experience.

In some embodiments, first pre-conditions corresponding to different self-correction algorithms may be determined by performing different correction experiments on different self-correction algorithms. When the ultrasonic gas meter performs a self-correction according to different self-correction algorithms, different first preset conditions may be selected to determine whether to issue the co-correction request, making a time for issuing the co-correction request more accurate.

In some embodiments, in response to the self-correction signal stability meeting the first preset condition, the ultrasonic gas meter may further determine whether the self-correction signal stability meets the self-correction condition.

In some embodiments, in response to the self-correction signal stability not meeting the self-correction condition, the ultrasonic gas meter does not need to perform the self-correction. At this time, reading data of the ultrasonic gas meter is accurate and does not need to be corrected.

In some embodiments, in response to the self-correction signal stability meeting the self-correction condition, the ultrasonic gas meter may determine a correction value of the ultrasonic gas meter based on a preset algorithm.

The self-correction condition refers to a condition under which the ultrasonic gas meter determines voluntarily whether the self-correction is required. In some embodiments, the self-correction condition may include the self-correction signal stability being less than a second stability threshold. The second stability threshold may be determined based on priori knowledge or historical experience. In some embodiments, the second stability threshold may be greater than the first stability threshold.

The preset algorithm refers to an algorithm preset to calculate the correction value. For example, the preset algorithm may be a fitting algorithm or a regression algorithm.

In some embodiments, the preset algorithm may be determined based on an environmental parameter.

The environmental parameter refers to a parameter related to a gas pipeline of the ultrasonic gas meter. For example, the environmental parameter may include a current gas temperature, a current gas pressure, a current environmental temperature, and a pipeline inner diameter. The current gas temperature, the current gas pressure, and the current environmental temperature may be collected by a sensor device configured in the smart gas object platform 150 and then uploaded to the smart gas device management platform 130 through the smart gas sensing network platform 140. Exemplarily, the sensor device includes but is not limited to a temperature sensor, a pressure sensor, etc. The pipeline inner diameter may be obtained by querying a database.

In some embodiments, the preset algorithm may be preset by the smart gas device management platform, and a determined preset algorithm may be sent to the ultrasonic gas meter by the smart gas device management platform.

In some embodiments, the smart gas device management platform may process the environmental parameter through a machine learning model to determine the preset algorithm. For example, the machine learning model is configured to fit the current gas temperature, the current gas pressure, the current environmental temperature, the pipeline inner diameter, the reading data of the ultrasonic gas meter, and the actual gas flow rate in a simulation experiment to determine a fitting coefficient. Further, a preset algorithm is determined based on the fitting coefficient and the environmental parameter.

An examplary preset algorithm is: correction value=fitting coefficient 1*current gas temperature+fitting coefficient 2*current gas pressure+fitting coefficient 3*current environmental temperature+fitting coefficient 4*pipe inner diameter (the algorithm here is only used as an example, and a fitting structure is usually non-linear).

In some embodiments, the smart gas device management platform may process the environmental parameter through a built-in fitting tool in the software to determine the preset algorithm. For example, the smart gas device management platform performs a regressive analysis on the current gas temperature, the current gas pressure, the current environmental temperature, the pipeline inner diameter, the reading data of the ultrasonic gas meter, and the actual gas flow rate in the simulation experiment through the built-in fitting tool in the software to determine a regression coefficient; and determine a preset algorithm based on the regression coefficient and the environmental parameter.

An examplary preset algorithm is: correction value=regression coefficient 1*current gas temperature+regression coefficient 2*current gas pressure+regression coefficient 3*current environmental temperature+regression coefficient 4*pipeline inner diameter (the algorithm here is only used as an example, and the fitting structure is usually non-linear). The software may include MATLAB, SPSS, SAS, and other software with built-in fitting tools.

The correction value refers to a difference between the actual gas flow and the reading data of the ultrasonic gas meter. For example, correction value=actual gas flow−the reading data of the ultrasonic gas meter.

In some embodiments, the ultrasonic gas meter may determine a correction value for the reading data of the ultrasonic gas meter based on a current environmental parameter and using the preset algorithm.

In some embodiments, in response to the self-correction signal stability meeting the self-correction condition, the ultrasonic gas meter may correct the reading data of the ultrasonic gas meter set based on the correction value. The reading data set is a combination of a preset amount of the reading data of the ultrasonic gas meter. Further descriptions regarding the reading data set may be found in FIG. 3 and related descriptions thereof.

In some embodiments, the ultrasonic gas meter may determine the self-correction signal stability of a corrected reading data set. The ultrasonic gas meter may determine that the self-correction signal stability of the corrected reading data set does not meet the first preset condition when the self-correction signal stability of the corrected reading data set still meets the self-correction condition. At this time, the ultrasonic gas meter may send the co-correction request to the smart gas device management platform.

In some embodiments, a corrected self-correction signal stability is determined in the same manner as the self-correction signal stability before correction, which may be found in related descriptions hereinabove and not be repeated here.

In some embodiments, the ultrasonic gas meter sends a co-correction request when the self-correction signal stability of the corrected ultrasonic gas meter once again meets the self-correction condition, which can avoid repeated self-correction of the ultrasonic gas meter, limit a count of self-corrections, and send a co-correction request timely, being helpful in solving problems efficiently and quickly and correcting problems timely.

The ultrasonic data refers to ultrasonic signal data. For example, the ultrasonic data may include signal data (e.g., the waveform, the amplitude, the frequency, etc.) of the ultrasonic gas meter.

In some embodiments, the smart gas device management platform may access ultrasonic data through a storage device inside the ultrasonic gas meter.

The gas medium data refers to data related to gas composition. For example, the gas medium data may include content data of methane, ethane, propane, and/or other trace impurities.

The gas medium data may be collected by the sensor device configured in the smart gas object platform. The gas medium data may be uploaded to the smart gas device management platform through the smart gas sensing network platform after the sensor device collects the gas medium data. Exemplarily, the sensor device includes but is not limited to a composition sensor, etc.

In step 220, determining a target signal stability value of the ultrasonic gas meter based on the ultrasonic data and the gas medium data.

The target signal stability value refers to a signal stability obtained from a correction on the ultrasonic gas meter by the smart gas device management platform. The correction on the ultrasonic gas meter by the smart gas device management platform is also called a co-correction. Further descriptions regarding the signal stability may be found in step 210 and related descriptions thereof.

In some embodiments, the target signal stability value may be determined by the smart gas device management platform. In some embodiments, the smart gas device management platform may determine the target signal stability value based on the ultrasonic data. For example, the smart gas device management platform determines the target signal stability value by determining the waveform and the frequency of the ultrasonic signal in the ultrasonic data as well as a variation of the amplitude. The greater the variation, the lower the target signal stability value.

In some embodiments, the smart gas device management platform may also determine the target signal stability value based on the ultrasonic data and the gas medium data. For example, the smart gas device management platform may process the ultrasonic data and/or the gas medium data through the preset algorithm or the machine learning model to determine the target signal stability value.

In some embodiments, the smart gas device management platform may perform a stability check on the ultrasonic data and the gas medium data to determine the target signal stability value. Detailed descriptions regrading the stability check may be found in FIG. 4 and related descriptions thereof.

In step 230, in response to the target signal stability value not meeting a second preset condition, determining a co-correction strategy and sending the co-correction strategy to the ultrasonic gas meter.

The second preset condition refers to a condition for determining whether the co-correction strategy is determined.

In some embodiments, the second preset condition may include that the target signal stability value is not less than a third stability threshold. The third stability threshold may be determined by a priori knowledge or historical experience.

The co-correction strategy refers to a correction strategy generated by the smart gas device management platform for correcting the reading data of the ultrasonic gas meter. In some embodiments, the co-correction strategy may include a co-correction value. The co-correction value is a correction value generated by the smart gas device management platform for correcting the reading data of the ultrasonic gas meter.

In some embodiments, in response to the target signal stability value not meeting the second preset condition, the smart gas device management platform may determine the co-correction strategy in a plurality of ways.

In some embodiments, the smart gas device management platform may determine the co-correction strategy based on the target signal stability value by querying a preset co-correction strategy table. The preset co-correction strategy table stores a plurality of different sets of reference signal stability values and their corresponding reference co-correction strategies. The preset co-correction strategy table may be determined based on data related to a historical co-correction strategy. In some embodiments, the smart gas device management platform may determine a reference signal stability value that is similar to or the same as the target signal stability value in a preset co-correction strategy table based on the target signal stability value, and determine a reference co-correction strategy corresponding to the reference signal stability value as a final co-correction strategy.

In some embodiments, in response to a target signal stability value not meeting a second preset condition, the smart gas device management platform may determine the co-correction strategy based on the weather data, historical reading data, gas data, and pipeline feature data.

The weather data refers to data that reflects the weather. In some embodiments, the weather data may include at least an environmental temperature and light data. The light data may include a light direction and a light intensity. The smart gas device management platform may obtain weather data by interacting with a database of a weather detection platform.

The historical reading data refers to reading data of the ultrasonic gas meter before the current moment. The reading data may reflect the gas flow data of the ultrasonic gas meter. The smart gas device management platform may obtain the historical reading data by interacting with the ultrasonic gas meter.

The gas data refers to data related to gas. The gas data may include basic gas data, gas medium data, and gas consumption data. The basic gas data may include a gas temperature, a gas humidity, a gas density, a gas pressure, a gas velocity, etc. The gas consumption data may be a gas flow rate used by a user.

The smart gas device management platform may obtain the basic gas data by interacting with the sensor device configured in the smart gas object platform. Exemplarily, the sensor device includes but is not limited to a composition sensor, a temperature sensor, a pressure sensor, a humidity sensor, a velocity sensor, etc. The smart gas device management platform may obtain gas consumption data by interacting with a household gas meter configured in the smart gas object platform. Further descriptions regarding the gas medium data may be found in step 210 an a related descriptions thereof.

The pipeline feature data may include the pipeline inner diameter, a pipeline outer diameter, and a pipeline material. The pipeline feature data may be obtained by querying the database.

In some embodiments, the co-correction strategy includes at least one of the three types including: (1) adjusting the preset algorithm; (2) determining if the ultrasonic gas meter needs to be checked (or corrected); (3) determining a new self-correction strategy.

In some embodiments, the smart gas device management platform may adjust the preset algorithm by selecting a preset algorithm with a higher accuracy and determine the correction value of the ultrasonic gas meter based on an adjusted preset algorithm. In some embodiments, the smart gas device management platform may predict related data corresponding to a current moment and a future moment through a co-correction model based on the weather data, the historical reading data, the gas data, and the pipeline feature data. Further, the smart gas device management platform may re-determine the preset algorithm with a higher accuracy according to a fitting algorithm based on the related data corresponding to the current moment and the future moment. The relevant data corresponding to the current moment may include the gas flow rate, and the relevant data corresponding to the future moment may include the gas flow rate, the gas temperature, the gas pressure, the environmental temperature, etc.

In some embodiments, the co-correction model may be a machine learning model with a custom structure. The co-correction model may also be a machine learning model of other structures, e.g., a neural network model, etc.

In some embodiments, an input of the co-correction model may include the weather data, the historical reading data, the gas data, and the pipeline feature data, and an output of the co-correction model may include a predicted gas flow rate at the current moment, a predicted gas flow rate at the future moment, a predicted gas temperature, a predicted gas pressure, a predicted environmental temperature, etc., at the future moment.

In some embodiments, the co-correction model may include an environmental data prediction layer and an ultrasonic data prediction layer.

In some embodiments, an input of the environmental data prediction layer may include the weather data, the gas data, and the pipeline feature data, and an output of the environmental data prediction layer may include the predicted gas temperature, the predicted gas pressure, the predicted environmental temperature, etc. at the future moment. In some embodiments, the environmental data prediction layer may be a deep neural network (DNN) model.

In some embodiments, the environmental data prediction layer may be obtained by training based on a plurality of first training samples with first labels. In some embodiments, a first training sample and a first label may be obtained based on historical data. The first training sample may include sample weather data, sample gas data, and sample pipeline feature data at a sample collection time point (which is a historical time). The first label may be determined based on an actual condition corresponding to the first training sample. The first label may include an actual gas temperature, an actual gas pressure, and an actual environmental temperature of the first training sample after the sample collection time point.

In some embodiments, an input of the ultrasonic data prediction layer may include the weather data, the historical reading data, the gas data, and the pipeline feature data, and an output of the ultrasonic data prediction layer may include the predicted gas flow at the current moment and the predicted gas flow at a future moment. In some embodiments, the ultrasonic data prediction layer may be a long short-term memory (LSTM) network model.

In some embodiments, the ultrasonic data prediction layer may be obtained by training based on a plurality of second training samples with second labels. In some embodiments, the second training sample and the second label may be obtained based on historical data. The second training sample may include sample historical reading data, sample weather data, sample gas data, and sample pipeline feature data at the sample collection time point (which is the historical time). The second label may be determined based on the actual condition corresponding to the second training sample. The second label may include an actual gas flow rate of the second training sample at the sample collection time point and an actual gas flow rate after the sample collection time point.

In some embodiments, the smart gas device management platform may designate the predicted gas flow rate at the current moment as the actual gas flow rate and refit it to determine the preset algorithm with a higher accuracy based on the pipeline inner diameter and a measured gas temperature, a measured gas pressure, and a measured environmental temperature at the current moment.

In some embodiments, the smart gas device management platform may designate the predicted gas flow rate at the future moment as the actual gas flow rate and refit it based on the pipeline inner diameter and the predicted gas temperature, the predicted gas pressure, and the predicted environmental temperature at the future moment to determine a new fitting coefficient or a new regression coefficient to determine the preset algorithm with higher accuracy.

Descriptions regarding a fitting process may be found in step 210 and related descriptions thereof.

In some embodiments, the smart gas device management platform may determine whether a check on the ultrasonic gas meter is required, and a determination result is designated as the co-correction strategy. In some embodiments, the smart gas device management platform may determine whether the ultrasonic gas meter needs to be checked based on the weather data, the ultrasonic data (e.g., current reading data), and the gas medium data. For example, the smart gas device management platform may determine the target signal stability value based on the ultrasonic data and the gas medium data, and the ultrasonic gas meter may be checked or reported for repair in response to the target signal stability value being less than a fourth stability threshold. The correction manner may include determining a correction value with a higher accuracy based on the preset algorithm with a higher accuracy, and correcting the reading data of the ultrasonic gas meter based on the correction value with a higher accuracy. For example, the correction manner includes a zero-point correction, damping setting, operation parameter setting, and abnormal condition correction.

The fourth stability threshold may be determined from historical data or priori knowledge. In some embodiments, the fourth stability threshold may be less than or equal to the third stability threshold.

In some embodiments, the smart gas device management platform may redetermine the self-correction strategy based on the weather data, the self-correction frequency, and the correction level. For example, the smart gas device management platform may reset the correction level and determine a new self-correction strategy based on a reset correction level.

In some embodiments, in response to the target signal stability value not meeting the second preset condition, the smart gas device management platform may send a determined co-correction strategy through the smart gas sensing network platform to the ultrasonic gas meter configured in the smart gas object platform for co-correction on the ultrasonic gas meter.

In step 240, evaluating a correction accuracy of the ultrasonic gas meter based on the co-correction strategy to perform the correction.

In some embodiments, the ultrasonic gas meter may perform the correction based on the co-correction strategy. For example, the smart gas device management platform may determine a new correction value of the reading data of the ultrasonic gas meter based on an updated self-correction strategy, and correct the reading data through the correction value.

The correction accuracy reflects closeness of corrected reading data to a true gas flow. The higher the correction accuracy, the closer the corrected reading data is to the true gas flow.

In some embodiments, the smart gas device management platform may assess the correction accuracy in a plurality of feasible ways. For example, if the ultrasonic gas meter recalculates the self-correction signal stability after performing the correction according to the co-correction strategy, the correction accuracy is higher in response to the self-correction signal stability meeting the first preset condition.

In some embodiments, in response to the co-correction request, the target signal stability value may be determined based on the ultrasonic data and the gas medium data; and in response to the target signal stability value not meeting the second preset condition, the co-correction strategy may be determined. Performing the correction based on the co-correction strategy can realize gas medium compensation for gas meter readings, calculate the correction accuracy, and improve an accuracy of flow monitoring.

Figure 3:
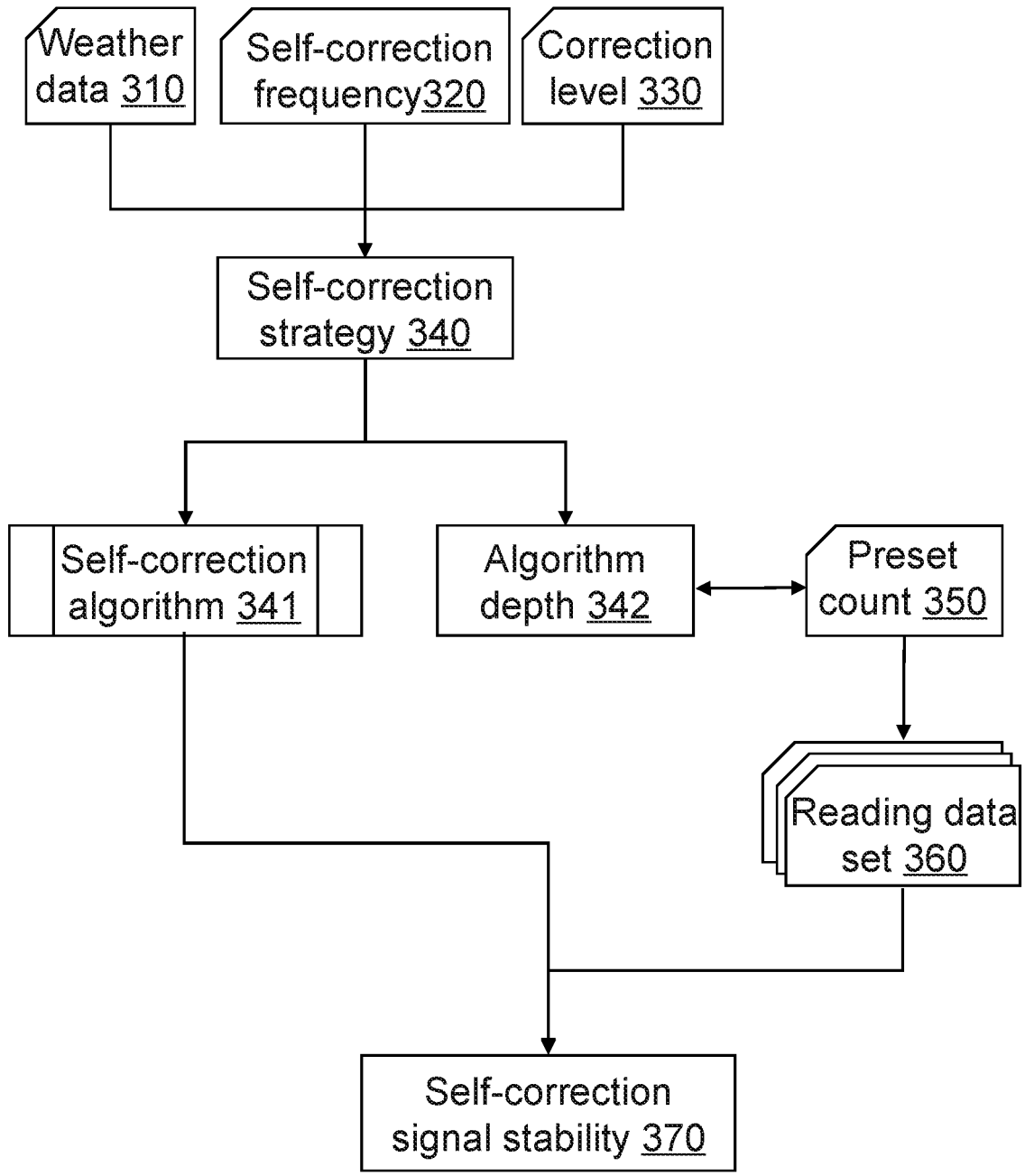
FIG. 3 is a schematic diagram illustrating an exemplary process for determining a self-correction signal stability according to some embodiments of the present disclosure.

In some embodiments, the self-correction strategy may be determined periodically by the smart gas device management platform and sent to the ultrasonic gas meter. As shown in FIG. 3, in some embodiments, the smart gas device management platform may determine a self-correction strategy 340 based on weather data 310, a self-correction frequency 320, and a correction level 330.

The self-correction frequency may reflect a count of times an ultrasonic gas meter performs a self-correction per unit of time.

In some embodiments, the smart gas device management platform may monitor a count of self-corrections that are performed on the ultrasonic gas meter in a time period, and calculate the self-correction frequency for the time period based on a count of monitoring times and a length of the time period. In some embodiments, the smart gas device management platform may obtain self-correction frequencies of a plurality of time periods in the above manner, and determine an average value of a plurality of self-correction frequencies as a final self-correction frequency.

The correction level refers to a self-correction intensity of the ultrasonic gas meter. In some embodiments, the higher the correction level, the higher the self-correction intensity (e.g., the higher the accuracy of a correction value), and the closer the corrected reading data of the ultrasonic gas meter is to an actual gas flow. The correction level may be preset manually or set by a system. In some embodiments, the higher the correction level, the higher the requirement for self-correction signal stability, at this time a first preset condition is more difficult to meet, i.e., the threshold for the ultrasonic gas meter to issue a co-correction strategy is lower.

The self-correction strategy refers to a self-correction manner of the ultrasonic gas meter. As shown in FIG. 3, in some embodiments, the self-correction strategy 340 may include at least a self-correction algorithm 341, an algorithm depth 342, etc. The algorithm depth may reflect time complexity of the self-correction algorithm.

In some embodiments, the self-correction algorithm may include processing the reading data (i.e., a reading data set) of the ultrasonic gas meter at a preset count of historical moments to determine the self-correction signal stability. The more the preset count, the higher the time complexity of the self-correction algorithm, and the deeper the algorithm depth.

In some embodiments, the self-correction algorithm includes at least three types, including (1) determining a variance (or a standard deviation, etc.) of the reading data set as the self-correction signal stability; (2) determining a mean value of the reading data set as the self-correction signal stability; (3) determining a statistical check result of the reading data set as the self-correction signal stability. Further descriptions regarding performing the self-correction algorithm may be found in related descriptions hereinafter.

In some embodiments, the smart gas device management platform may construct a self-correction feature vector based on the weather data, the self-correction frequency, and the correction level. In some embodiments, the smart gas device management platform may also construct the self-correction feature vector based on the weather data, the self-correction frequency, the correction level, and a gas temperature.

In some embodiments, the smart gas device management platform may retrieve a vector database based on a self-correction feature vector to determine a correlated feature vector whose vector similarity with the self-correction feature vector meets a similarity threshold, and designate a reference self-correction strategy corresponding to the correlated feature vector as the self-correction strategy. The vector database includes a plurality of reference feature vectors and corresponding reference self-correction strategies, and self-correction algorithms and algorithm depths of different reference self-correction strategies are different. The correlated feature vector is a reference feature vector whose vector similarity with the self-correction feature vector meets the similarity threshold.

In some embodiments, if there are a plurality of associated feature vectors that meet the similarity threshold, the smart gas device management platform may designate the reference self-correction strategy corresponding to the correlated feature vector with a highest vector similarity as the self-correction strategy.

By determining the self-correction strategy in the above manner, the smart gas device management platform may select a most appropriate self-correction algorithm from a plurality of self-correction algorithms and determine a most appropriate algorithm depth.

In some embodiments, the smart gas device management platform determines the self-correction strategy based on the weather data, the self-correction frequency, and the correction level, which can take a plurality of factors into account and help determine a self-correction strategy that is more in line with an actual situation, thereby improving a correction accuracy of the self-correction strategy to make a correction result more accurate.

In some embodiments, the ultrasonic gas meter may determine the self-correction signal stability based on the self-correction strategy.

As shown in FIG. 3, in some embodiments, the ultrasonic gas meter may be designated as a reading data set 360 by obtaining the reading data of the ultrasonic gas meter at a preset count 350 of historical moments; and determine a self-correction signal stability 370 by a self-correction algorithm 341 based on a reading data set 360.

The preset count refers to a preset count of history moments to be selected.

In some embodiments, the preset count may be determined by the self-correction strategy. As shown in FIG. 3, in some embodiments, the preset count 350 is equal to an algorithm depth 342. For example, the preset count may be positively correlated with the algorithm depth. The deeper the algorithm depth, the higher the time complexity of the self-correction algorithm, and the greater the count of historical moments that need to be selected. In some embodiments, a correspondence between the algorithm depth and the preset count may be preset, and the preset count may be determined based on the correspondence after determining the algorithm depth of the self-correction algorithm in the self-correction strategy.

The reading data is the gas flow data measured by the ultrasonic gas meter. The reading data set refers to a collection of various reading data.

In some embodiments, the ultrasonic gas meter may determine the self-correction signal stability through the self-correction algorithm based on the reading data set.

In some embodiments, when a determined self-correction algorithm is that a variance (or a standard deviation, etc.) of the reading data set is determined as the self-correction signal stability, the ultrasonic gas meter may calculate a variance (or a standard deviation, etc.) of the reading data of the ultrasonic gas meter and designate a calculation result as the self-correction signal stability.

In some embodiments, when the determined self-correction algorithm is that a mean value of the reading data set is determined as the self-correction signal stability, the ultrasonic gas meter may calculate a mean value of the reading data of the ultrasonic gas meter and d a designate a calculation result as the self-correction signal stability.

In some embodiments, when the determined self-correction algorithm is that a statistical check result of the reading data set is determined as the self-correction signal stability, the ultrasonic gas meter may also determine reading data with abnormality in the reading data set based on a statistical check algorithm. Further, the ultrasonic gas meter may also designate an amount of abnormal reading data or a ratio of the amount of abnormal reading data to a total amount of reading data in the reading data set as the statistical check result, and the statistical check result is the self-correction signal stability. The statistical check algorithm may include at least: a Z-score check manner, a Tukey check manner, and a Hampel check manner.

In some embodiments, the self-correction signal stability is determined through the self-correction algorithm, the reading data of the ultrasonic meter at a plurality of historical moments is designated as a reading data set, the larger the amount of the reading data, the broader the time range considered, which helps to determine the self-correction signal stability more accurately.

Figure 4:
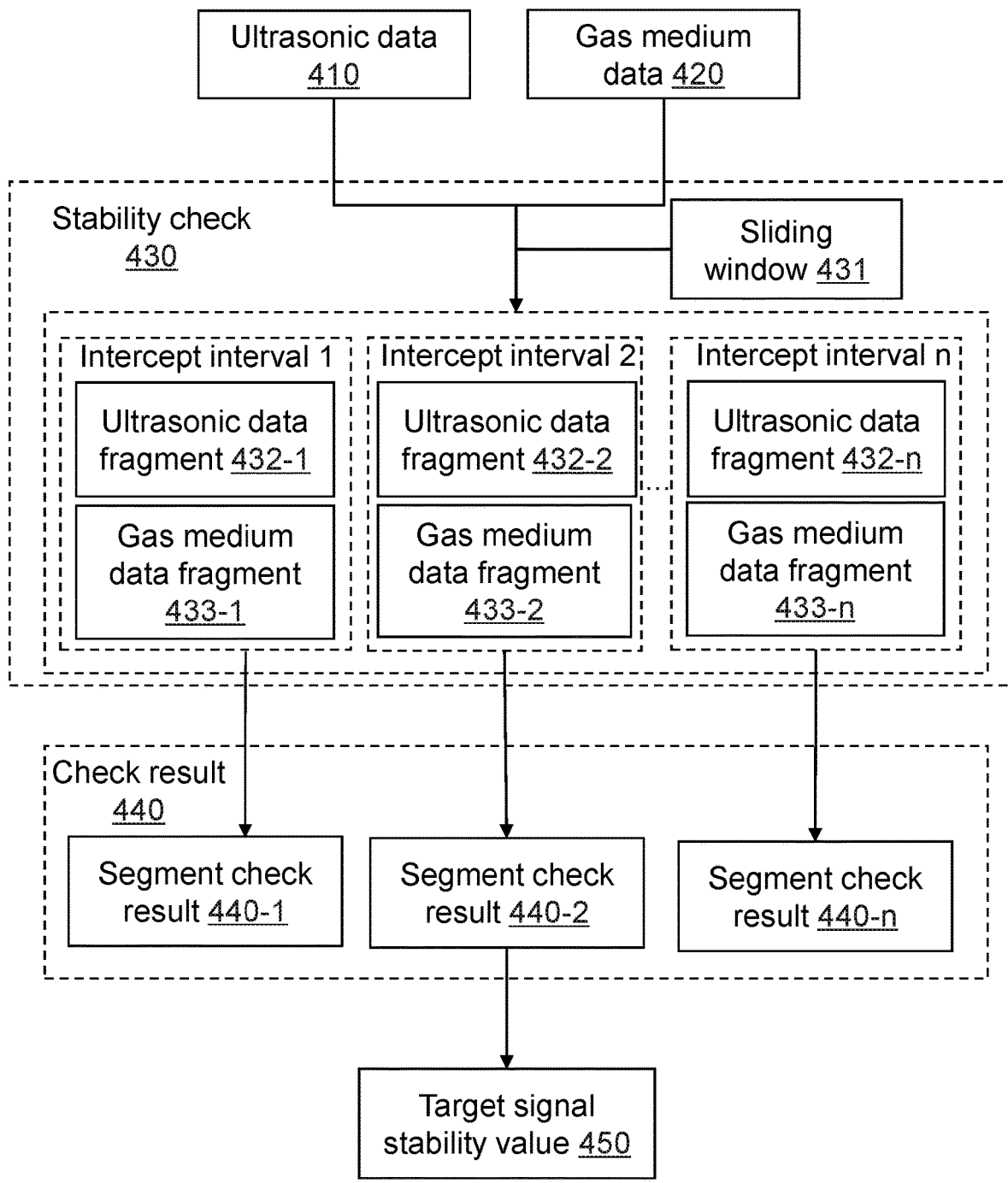
FIG. 4 is a schematic diagram illustrating an exemplary process for determining a target signal stability according to some embodiments of the present disclosure.

FIG. 4 is a schematic diagram illustrating an exemplary process for determining target signal stability according to some embodiments of the present disclosure.

In some embodiments, a smart gas device management platform may perform a stability check 430 based on ultrasonic data 410 and gas medium data 420; and determine a target signal stability value 450 of the ultrasonic gas meter based on a check result 440. Further descriptions regarding the ultrasonic data, the gas medium data, and a target signal stability value may be found in FIG. 2 and related descriptions thereof.

The stability check is a check manner used to check a stability (i.e., signal stability) of an ultrasonic signal. The stability check may be divided into a descriptive manner and a metrological manner. The descriptive manner may include a graph check, e.g., a time-series graph check and an autocorrelation graph check. The metrological manner may include a statistical check, such as a unit root check and a Phillips-Perron check (which is referred to as a PP check).

In some embodiments, the smart gas device management platform may be stably checked by a built-in check tool in statistical software. The statistical software may include but is not limited to MATLAB, SPSS, and SAS.

In some embodiments, the smart gas device management platform may construct a time series of the ultrasonic data and the gas medium data according to a collection time, and perform the stability check based on the time series and a check condition. The smart gas device management platform may construct a time series r t of the ultrasonic data and the gas medium data according to the collection time through a p-order autoregressive model (which is an AR(p) model). An examplary time series is $r_t = \alpha_1 r_{t-1} + \alpha_2 r_{t-2} + \ldots + \alpha_p r_{t-p} + \omega_t = \Sigma_{i=1}^{P} \alpha_i r_{t-i} + \omega_t$, wherein, $r_t$ denotes the time series, $\alpha_1, \ldots,$ and $\alpha_p$ denote autoregressive coefficients, $\omega_t$ denotes a random variable in white noise, and t denotes a time.

In some embodiments, the check condition is related to the check manner. For example, a stability determination condition corresponding to an ADF check may be designated as the check condition when performing the ADF check. In some embodiments, the more stable the ultrasonic signal, the higher the signal stability value when the time series is a stable series.

In some embodiments, the smart gas device management platform may determine whether the time series is the stable series based on the time series constructed hereinabove through a unit root check (e.g., the ADF check) or the PP check.

In some embodiments, the smart gas device management platform determines the target signal stability value by performing the stability check on the ultrasonic data and the gas medium data, which helps to calculate the target signal stability value more scientifically and accurately.

In some embodiments, the smart gas device management platform may intercept at least one ultrasonic data fragment and at least one gas medium data fragment through a sliding window 431 based on the ultrasonic data 410 and the gas medium data 420 at successive moments; and determine a segment check result based on ultrasonic data fragment and gas medium data fragment of each intercept interval; and determine the target signal stability value 450 of the ultrasonic gas meter based on at least one segment check result.

The sliding window may be used to divide successive moments into a plurality of time segments.

In some embodiments, a window feature of the sliding window may include an intercepted interval length and a sliding step length.

The intercepted interval length is a time length of a divided time segment.

The sliding step is a length of time between two adjacent divided time segments.

A sliding window interception refers to a process for sliding a window from front to back based on a time order and intercepting data in the sliding window for a time period in each sliding step length until entire data is intercepted. A plurality of ultrasonic data fragments are obtained when intercepting the ultrasonic data; and a plurality of gas medium data fragments are obtained when intercepting the gas medium data.

In some embodiments, the window feature is related to weather data and gas temperature. In some embodiments, the intercepted interval length and the sliding step length are related to the weather data and the gas temperature. Further descriptions regarding the weather data may be found in FIG. 2.

In some embodiments, in response to a variation of the weather data and the gas temperature being higher than a variation threshold, the smart gas device management platform may increase the intercepted interval length and the sliding step length. The variation threshold is a preset value based on historical experience.

In some embodiments, the ultrasonic data and gas medium data may change substantially in response to rapid changes in the environmental temperature or the gas temperature to determine the window feature (using a larger intercepted interval length and sliding step length), which helps to save computational resources and improve an accuracy of the fragment stability check.

The segment data is a part of data corresponding to the intercept interval. The ultrasonic data fragment is a part of the ultrasonic data corresponding to an intercept interval intercepted based on the sliding window, and the gas medium data fragment is a part of the gas medium data corresponding to an intercept interval intercepted based on the sliding window. As shown in FIG. 4, an intercept interval 1 may correspond to an ultrasonic data fragment 432-1 and a gas medium data fragment 433-1, an intercept interval 2 may correspond to an ultrasonic data fragment 432-2 and a gas medium data fragment 433-2, . . . , and an intercept interval n may correspond to an ultrasonic data fragment 432-$n$ and a gas medium data fragment 433-$n$.

In some embodiments, the smart gas device management platform may perform a stability check on the ultrasonic data fragment and gas medium data fragment corresponding to each intercept interval to obtain the segment check result. The segment check result refers to a check result obtained by performing the stability check based on the segment data. As shown in FIG. 4, the intercept interval 1 corresponds to a segment check result 440-1, the intercept interval 2 corresponds to a segment check result 440-2, . . . , and the intercept interval n corresponds to a segment check result 440-$n$.

A way to obtain the segment check result may be found in a way to perform the stability check described above.

In some embodiments, the smart gas device management platform may determine a stability rate based on a segment check result of the ultrasonic data and the gas medium data at each intercept interval and determine the target signal stability value of the ultrasonic gas meter based on the stability rate.

In some embodiments, the stability rate may be determined based on stability check results at all intercept intervals. For example, the stability rate=a result of dividing a count of intercept intervals where the segment check result is determined to be a stability series by a total count of divided intercept intervals. A way to determine the stability series may be found in related descriptions hereinabove. In some embodiments, the smart gas device management platform may directly designate the stability rate as the target signal stability value.

In some embodiments, based on the sliding window and the intercept interval, the ultrasonic data and the gas medium data at all moments are divided, the target signal stability value is calculated in intervals, and the target signal stability value is determined by the stability rates at all moments, which helps to improve an accuracy of the target signal stability value.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment" "an embodiment," and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially. For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A metering and correcting method for an ultrasonic gas meter based on smart gas Internet of Things (IoT), wherein the metering and correcting method is implemented on a smart gas device management platform of a metering and correcting system for an ultrasonic gas meter based on smart gas IoT and comprises:

in response to receiving a co-correction request from the ultrasonic gas meter, obtaining ultrasonic data and gas medium data, wherein the co-correction request is issued when a self-correction signal stability of the ultrasonic gas meter does not meet a first preset condition, and the self-correction signal stability is determined by the ultrasonic gas meter based on a self-correction strategy; wherein the self-correction strategy includes at least a self-correction algorithm and an algorithm depth, and determining the self-correction signal stability by the ultrasonic gas meter based on the self-correction strategy includes:

obtaining a preset amount of reading data of the ultrasonic gas meter in a historical moment as a reading data set, the preset amount being related to the algorithm depth; and determining the self-correction signal stability by the self-correction algorithm based on the reading data set;

determining a target signal stability value of the ultrasonic gas meter based on the ultrasonic data and the gas medium data;

in response to the target signal stability value not meeting a second preset condition, determining a co-correction strategy and sending the co-correction strategy to the ultrasonic gas meter; and evaluating a correction accuracy of the ultrasonic gas meter for performing a correction process based on the co-correction strategy.

2. The metering and correcting method of claim 1, wherein the self-correction strategy is periodically determined by the smart gas device management platform and sent to the ultrasonic gas meter, and a manner for determining the self-correction strategy includes:

determining the self-correction strategy based on weather data, a self-correction frequency, and a correction level.

3. The metering and correcting method of claim 1, wherein the first preset condition is determined by the ultrasonic gas meter, and a manner for determining the first preset condition includes:

determining the first preset condition based on the self-correction algorithm.

4. The metering and correcting method of claim 1, further comprising:

in response to the self-correction signal stability meeting a self-correction condition, determining a correction value of the ultrasonic gas meter by the ultrasonic gas meter based on a preset algorithm, the preset algorithm being determined based on an environmental parameter.

5. The metering and correcting method of claim 4, further comprising:

in response to the self-correction signal stability meeting the self-correction condition, the ultrasonic gas meter performing following operations including:

correcting the reading data set of the ultrasonic gas meter based on the correction value;

determining a self-correction signal stability of a corrected reading data set; and determining the self-correction signal stability of the corrected reading data set not meeting the first preset condition when the self-correction signal stability of the corrected reading data set still meets the self-correction condition.

6. The metering and correcting method of claim 1, wherein the determining a target signal stability value of the ultrasonic gas meter based on the ultrasonic data and the gas medium data includes:

performing a stability check on the ultrasonic data and the gas medium data; and determining the target signal stability value of the ultrasonic gas meter based on a check result.

7. The metering and correcting method of claim 6, wherein the stability check includes:

intercepting at least one ultrasonic data fragment and at least one gas medium data fragment through a sliding window based on ultrasonic data and gas medium data at successive moments;

determining a fragment check result based on ultrasonic data fragment and gas medium data fragment of each intercept interval; and determining the target signal stability value of the ultrasonic gas meter based on at least one fragment check result.

8. The metering and correcting method of claim 1, wherein the in response to the target signal stability value not meeting a second preset condition, determining a co-correction strategy includes:
in response to the target signal stability value not meeting the second preset condition, determining the co-correction strategy based on the weather data, historical reading data, gas data, and pipeline feature data.

9. A metering and correcting system for an ultrasonic gas meter based on smart gas Internet of Things (IoT), wherein the metering and correcting system for the ultrasonic gas meter based on the smart gas IoT comprises a smart gas user platform, a smart gas service platform, a smart gas device management platform, a smart gas sensing network platform, and a smart gas object platform connected in sequence;
the smart gas user platform is configured to send a query instruction of gas device management information to the smart gas device management platform through the smart gas service platform; and
the smart gas device management platform is configured to send instructions for obtaining gas device related data through the smart gas sensing network platform to the smart gas object platform in response to the query instruction of the gas device management information and receive the gas device related data uploaded by the smart gas object platform; process the gas device related data to obtain the gas device management information; and upload the gas device management information to the smart gas user platform through the smart gas service platform, or send the gas device management information to the smart gas object platform through the smart gas sensing network platform;
wherein the gas device related data at least includes ultrasonic data and gas medium data, the gas device management information at least includes a co-correction strategy for correcting the ultrasonic gas meter, and a process for determining the co-correction strategy includes:
in response to receiving a co-correction request from the ultrasonic gas meter, obtaining the ultrasonic data and the gas medium data, wherein the co-correction request is issued when a self-correction signal stability of the ultrasonic gas meter does not meet a first preset condition, and the self-correction signal stability is determined by the ultrasonic gas meter based on a self-correction strategy; wherein the self-correction strategy includes at least a self-correction algorithm and an algorithm depth, and the ultrasonic gas meter is configured to:
obtain a preset amount of reading data of the ultrasonic gas meter in a historical moment as a reading data set, the preset amount being related to the algorithm depth; and
determine the self-correction signal stability by the self-correction algorithm based on the reading data set;
determining a target signal stability value of the ultrasonic gas meter based on the ultrasonic data and the gas medium data; and
in response to the target signal stability value not meeting a second preset condition, determining the co-correction strategy.

* * * * *